US008055311B2

(12) United States Patent
Izumi et al.

(10) Patent No.: US 8,055,311 B2
(45) Date of Patent: Nov. 8, 2011

(54) MOBILE COMMUNICATION TERMINAL DRIVEN BY POWER RECEIVED FROM SECONDARY BATTERY, CHARGE MODE SWITCHING METHOD AND CHARGE MODE SWITCHING PROGRAM EXECUTED IN MOBILE COMMUNICATION TERMINAL

(75) Inventors: Takashi Izumi, Nara (JP); Yukihiro Kawamoto, Kashiba (JP); Atsumi Okamoto, Ikoma (JP); Yoichi Kasamaru, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1183 days.

(21) Appl. No.: 11/761,754

(22) Filed: Jun. 12, 2007

(65) Prior Publication Data

US 2007/0287509 A1    Dec. 13, 2007

(30) Foreign Application Priority Data

Jun. 13, 2006    (JP) .................................. 2006-164056

(51) Int. Cl.
*H04B 1/38*    (2006.01)
(52) U.S. Cl. ......... 455/573; 455/572; 455/574; 320/150
(58) Field of Classification Search ................... 455/573
See application file for complete search history.

(56) References Cited

U.S. PATENT DOCUMENTS

| 5,506,490 | A | * | 4/1996 | DeMuro | 320/106 |
| 5,804,945 | A | * | 9/1998 | Sato et al. | 320/134 |
| 2004/0097275 | A1 | * | 5/2004 | Ohno et al. | 455/572 |
| 2004/0102228 | A1 | * | 5/2004 | Hakamata et al. | 455/572 |
| 2005/0237030 | A1 | * | 10/2005 | Takenaka | 320/150 |

FOREIGN PATENT DOCUMENTS

| JP | 11-187584 A | 7/1999 |
| JP | 2004-104910 A | 4/2004 |
| JP | 2005-45669 A | 2/2005 |

OTHER PUBLICATIONS

Japanese Office Action dated Jun. 24, 2008 (mailing date), issued in corresponding Japanese Patent Application No. 2006-164056.

* cited by examiner

*Primary Examiner* — Duc Nguyen
*Assistant Examiner* — Ajibola Akinyemi
(74) *Attorney, Agent, or Firm* — Morrison & Foerster LLP

(57) ABSTRACT

A mobile phone includes an external power supply terminal receiving power from the external power supply, a secondary battery charging at least part of the received power and supplying the charged power to a load, a radio circuit receiving power from the secondary battery and allowing transmission power to be varied, and a control portion detecting the transmission power level of the radio circuit and switching to any of a plurality of charge modes having different time periods for charging the secondary battery, based on the detected transmission power level.

15 Claims, 9 Drawing Sheets

MOBILE COMMUNICATION TERMINAL DRIVEN BY POWER RECEIVED FROM SECONDARY BATTERY, CHARGE MODE SWITCHING METHOD AND CHARGE MODE SWITCHING PROGRAM EXECUTED IN MOBILE COMMUNICATION TERMINAL

This application is based on Japanese Patent Application No. 2006-164056 filed with Japan Patent Office on Jun. 13, 2006, the entire content of which is hereby incorporated by reference.

BACKGROUND OF THE INVENTION

1. Field of the Invention

The present invention relates to a mobile communication terminal, a charge mode switching method and a charge mode switching program, and more particularly to a mobile communication terminal driven by power received from a secondary battery, a charge mode switching method and a charge mode switching program executed in the mobile communication terminal.

2. Description of the Related Art

Mobile communication terminals, typically mobile phones, have radio circuits which generate heats in wireless communication with radio base stations. On the other hand, mobile phones employ secondary batteries such as lithium ion batteries or nickel hydrogen batteries as drive sources, which generate heat during charging. Therefore, in wireless communication during charging of a secondary battery, these two heat sources generate heat, possibly causing the temperature to increase.

However, a radio circuit of a mobile phone employing CDMA (Code Division Multiple Access) scheme has variable transmission power, where radio waves are output with stronger transmission power with the increasing distance from a radio base station. The amount of heat generation is increased with stronger transmission power, and the amount of heat generation is decreased with weaker transmission power. Therefore, the amount of heat generation from a secondary battery does not always have to be reduced, since the temperature of a radio circuit is not so increased in the case of weak transmission power. On the other hand, it is desired to extend a duration of battery charging as longer as possible to extend a call duration.

SUMMARY OF THE INVENTION

In accordance with an aspect of the present invention, a mobile communication terminal includes: a power reception portion to externally receive power; a charge portion to charge at least part of the received power and supply the charged power to a load; a radio communication portion to receive power from the charge portion and allow transmission power to be varied; a transmission power detection portion to detect transmission power of the radio communication portion; and a control portion to switch to any one of a plurality of charge modes having different time periods to charge the charge portion, based on the detected transmission power.

In accordance with another aspect of the present invention, a charge mode switching method is performed in a mobile communication terminal. The mobile communication terminal includes a power reception portion to externally receive power, a charge portion to charge at least part of the received power and supply the charged power to a load, and a radio communication portion to receive power from the charge portion and allow transmission power to be varied. The charge mode switching method includes the steps of: detecting transmission power of the radio communication portion; and switching to any of a plurality of charge modes having different time periods for charging the charge portion, based on the detected transmission power.

In accordance with a further aspect of the present invention, a charge mode switching program is executed in a mobile communication terminal. The mobile communication terminal includes a power reception portion to externally receive power, a charge portion to charge at least part of the received power and supply the charged power to a load, a radio communication portion to receive power from the charge portion and allow transmission power to be varied, and a control portion. The charge mode switching program causes the control portion to perform the steps of: detecting transmission power of the radio communication portion; and switching to any of a plurality of charge modes having different time periods for charging the charge portion, based on the detected transmission power.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
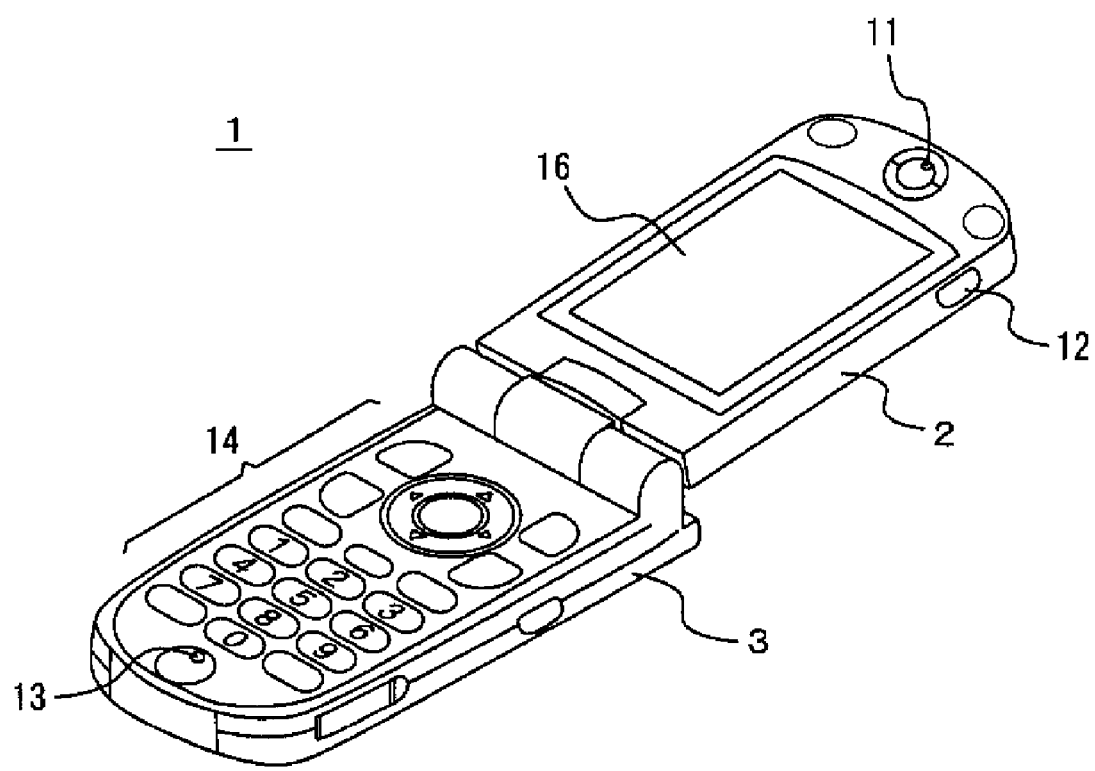
FIG. 1 is an external perspective view of a mobile phone in an embodiment of the present invention.

In the following, an embodiment of the present invention will be described with reference to the figures. In the following description, the same parts will be denoted with the same reference characters. Their designations and functions are also the same. Therefore, detailed description thereof will not be repeated.

FIG. 1 is an external perspective view of a mobile phone in an embodiment of the present invention. Referring to FIG. 1, a mobile phone 1 includes an operation-side portion 3 and a display-side portion 2. On an inner surface of operation-side portion 3, operation keys 14 including ten keys, a call key and the like and a microphone 13 are arranged. On an outer surface opposite to the inner surface, a camera 24 (see FIG. 2) is arranged. On an inner surface of display-side portion 2, a liquid crystal display (LCD) 16 and a first speaker 11 as a receiver are arranged. On a side surface of display-side portion 2, a second speaker 12 is arranged. Although here mobile phone 1 includes LCD 16 by way of example, LCD 16 may be replaced by an organic EL (Electro Luminescence) display. Operation-side portion 3 and display-side portion 2 are rotatably jointed to each other with a hinge mechanism so that operation-side portion 3 and display-side portion 2 can be opened and closed freely.

Figure 2:
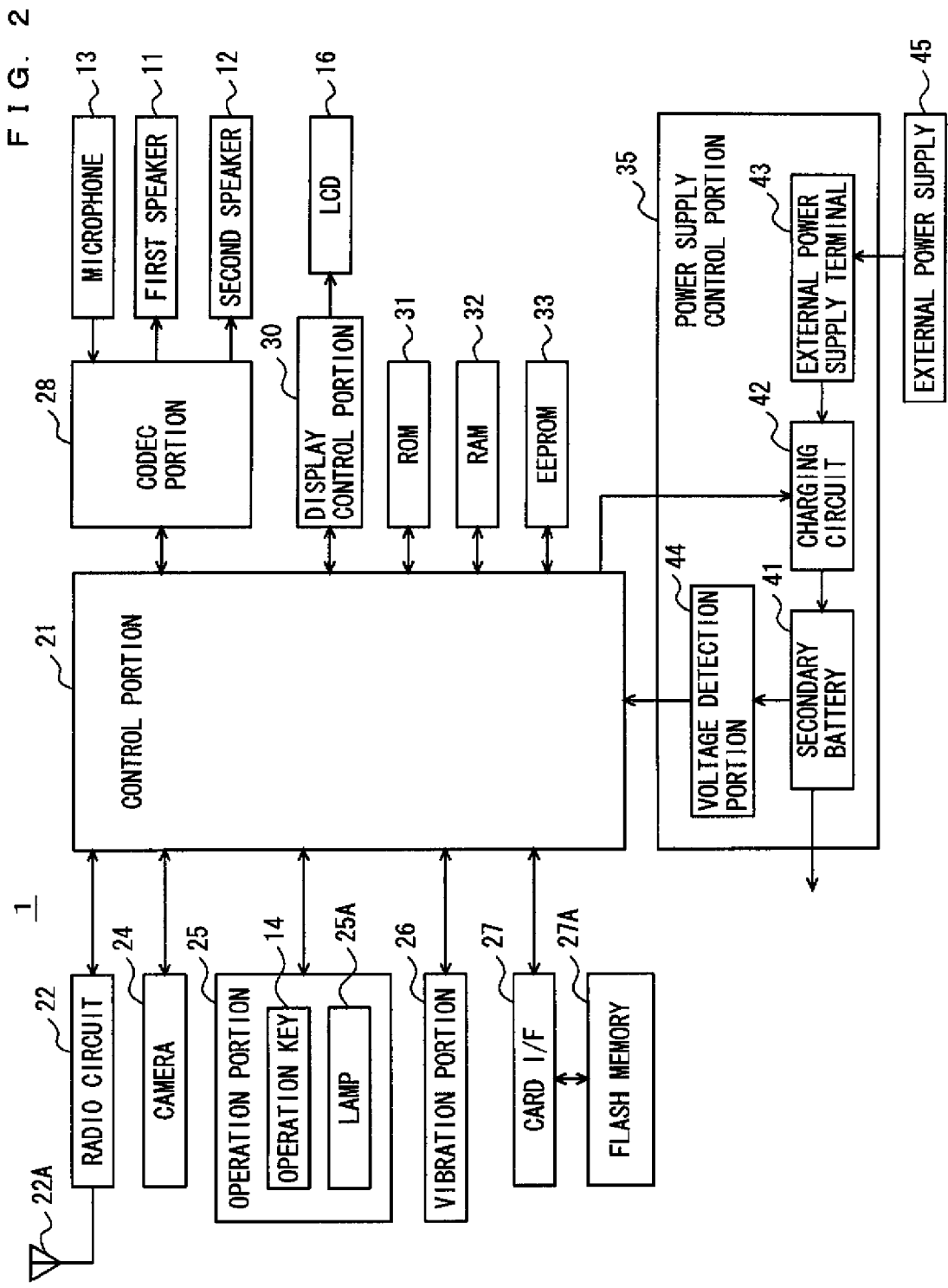
FIG. 2 is a functional block diagram showing an exemplary function of a mobile phone in the embodiment.

FIG. 2 is a functional block diagram showing an exemplary function of the mobile phone in the present embodiment. Referring to FIG. 2, mobile phone 1 includes a control portion 21 for controlling the entire mobile phone 1, a radio circuit 22 connected to an antenna 22A, a codec portion 28 for processing audio data, microphone 13, first speaker 11 and second speaker 12 each connected to codec portion 28, camera 24, an operation portion 25 accepting an input of an operation by a user, a display control portion 30 for controlling display on LCD 16, an ROM (Read Only Memory) 31 for storing, for example, a program executed in control portion 21, an RAM (Random Access Memory) 32 for use as a work area for control portion 21, an EEPROM (Electronically Erasable and Programmable ROM) 33 storing, for example, data referred to by a program in a nonvolatile manner, a vibration portion 26, a card interface (I/F) 27, and a power supply control portion 35.

In the present embodiment, ROM 31 and EEPROM 33 are provided to store a program executed by control portion 21 and the like and to store data referred to by a program and the like in a nonvolatile manner. However, these memories may be replaced by a flash ROM so that a program and data and the like referred to by the program may be separately stored in determined regions in the flash ROM.

Radio circuit 22 is controlled by control portion 21 to communicate with a radio base station. Specifically, a radio signal received by antenna 22A is input and an audio signal generated by demodulating a radio signal is output to codec portion 28. In addition, radio circuit 22 receives an audio signal from codec portion 28 and outputs a radio signal generated by modulating an audio signal to antenna 22A. Codec portion 28 decodes an audio signal input from radio circuit 22 and converts and amplifies the decoded digital audio signal into an analog signal, which is then output to first speaker 11 and second speaker 12. In addition, codec portion 28 receives an analog audio signal from microphone 13, converts and encodes the audio signal into a digital signal, and then outputs the encoded audio signal to radio circuit 22.

Radio circuit 22 allows transmission power to be varied. Radio circuit 22 receives a control signal from a radio base station, and outputs a transmission power level included in the control signal to control portion 21 and also outputs a radio signal with transmission power corresponding to a transmission power level. Radio circuit 22 generates a larger amount of heat with stronger transmission power. Here, for the sake of illustration, the transmission power levels include three levels, namely, "strong," "medium," and "weak." Here, the transmission power levels are not limited to three levels as long as a plurality of levels are set. If the transmission power level is strong, the amount of heat generation of radio circuit 22 is largest, and if the transmission power level is weak, the amount of heat generation of radio circuit 22 is smallest. If the transmission power level is medium, the amount of heat generation of radio circuit 22 is smaller than when the transmission power level is strong and is larger than when the transmission power level is weak. Although here the transmission power level used to define the transmission power of radio circuit 22 and the transmission power level used for control portion 21 to switch a charge mode are the same, they may be different. For example, the transmission power levels used to switch a charge mode may be reduced in number, and one transmission power level may include a plurality of transmission power levels used to define transmission power of radio circuit 22.

In the forgoing example, the transmission power level is received from a radio base station. Alternatively, the transmission power level may be determined on the mobile phone 1 side. In this case, radio circuit 22 detects an electric field intensity of radio waves transmitted by a radio base station and outputs the detected intensity to control portion 21. Control portion 21 determines a transmission power level based on the electric field intensity. A table in which an electric field intensity and a transmission power level are associated with each other is stored in EEPROM 33 so that the transmission power level corresponding to the detected electric field intensity is determined. Radio circuit 22 outputs a radio signal with the transmission power corresponding to the transmission power level determined by control portion 21. In the table in which an electric field intensity and a transmission power level are associated with each other, the transmission power level "weak" corresponds to the high electric field intensity, the transmission power level "strong" corresponds to the low electric field intensity, and the transmission power level "medium" corresponds to the intermediate electric field intensity. Storage of the table in EEPROM 33 allows the table to be overwritten later. Therefore, for example, tables different between mobile phone 1 used in cold climate areas and mobile phone 1 used in warm climate areas may be stored in EEPROM 33. Furthermore, as the thermal sensing varies among individuals, the table stored in EEPROM 33 may be overwritten by a user. In addition, in order to allow a user to set charge modes such as "charge-priority mode" and "temperature-priority mode," two tables in which an electric field intensity and a transmission power level are associated with each other may be stored beforehand respectively corresponding to "charge-priority mode" and "temperature-priority mode," so that the tables used to determine a transmission power level are switched according to the charge mode set by the user.

Display control portion 30 is controlled by control portion 21 and controls LCD 16 according to an instruction input from control portion 21 to cause an image to appear on LCD 16. Images appearing on LCD 16 include moving images and still images.

A removable flash memory card 27A is attached to card I/F 27. Control portion 21 can access flash memory card 27A through card I/F 27. Although in this example, a charge mode switching program to be executed in control portion 21 is stored in ROM 31, the charge mode switching program may be stored in flash memory card 27A and may be read from flash memory card 27A to be executed in control portion 21. Recording media for storing a charge mode switching program is not limited to flash memory card 27A and may be a flexible disk, a cassette tape, an optical disk (CD-ROM (Compact Disc-ROM)/MO (Magnetic Optical Disc)/MD (Mini Disc)/DVD (Digital Versatile Disc)), an IC card (including a memory card), an optical card, a semiconductor memory such as a mask ROM, an EPROM, and an EEPROM, or the like. Alternatively, mobile phone 1 may be connected to the Internet via radio circuit 22 so that a program is downloaded from the computer connected to the Internet and is then executed in control portion 21. Programs referred to herein include not only a program directly executable by control portion 21 but a source program, a compressed program, an encrypted program, and the like.

Camera 24 includes a lens and an optoelectronic transducer such as a CMOS (Complementary Metal Oxide Semiconductor) sensor to focus light collected by the lens onto the CMOS sensor. The CMOS sensor then optoelectronically converts the received light and outputs image data to control portion 21. Camera 24 is controlled by control portion 21 and starts picking up an image on an instruction from control portion 21 to output the obtained still image data or moving image data to control portion 21. Camera 24 includes an image processing circuit performing image processing for improving the image quality of the optoelectronically converted image data and an A/D converter circuit converting image data from analog to digital. Control portion 21 outputs the still image data or moving image data output by camera 24 to display control portion 30 for display on LCD 16 or encodes the still image data or moving image data in a compression encoding scheme for storage into EEPROM 34 or flash memory card 27A attached to card I/F 27.

Operation portion 25 includes operation keys 14 and a lamp 25A. Operation key 14 accepts an input of an operation by the user and outputs the accepted operation to control portion 21. Lamp 25A is controlled by control portion 21 to emit light.

Power supply control portion 35 includes an external power supply terminal 43 to which an external power supply 45 is connected, a secondary battery 41 for supplying power to each load of mobile phone 1, a charging circuit 42 provided between secondary battery 41 and external power supply terminal 43, and a voltage detection portion 44. External power supply 45 is an A/C adaptor connected to the mains. Secondary batter 41 is a NiCad battery, a nickel hydrogen battery, a lithium polymer battery, or the like. Charging circuit 42 is controlled by control portion 21 to switch between an on state in which power received by external power supply terminal 43 from external power supply 45 is output to secondary battery 41 and an off state in which it is not output to secondary battery 41. Voltage detection portion 44 detects an output voltage of secondary battery 41 and outputs the detected output voltage to control portion 21.

Figure 3:
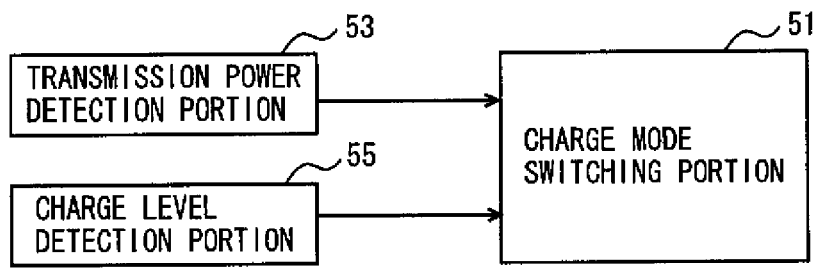
FIG. 3 is a functional block diagram showing an overall function of a control portion.

FIG. 3 is a functional block diagram showing an overall function of the control portion. Referring to FIG. 3, control portion 21 includes a transmission power detection portion 53, a charge level detection portion 55, and a charge mode switching portion 51. Transmission power detection portion 53 receives a transmission power level from radio circuit 22, outputs the received transmission power level to charge mode switching portion 51 and in addition, allows radio circuit 22 to wirelessly communicate in the transmission power level. Charge level detection portion 55 receives an output voltage of secondary battery 41 from voltage detection portion 44. Charge level detection portion 55 calculates the remaining level of power stored in secondary battery 41 based on the received output voltage of secondary battery 41. If the remaining level of secondary battery 41 falls below a predetermined prescribed value (low battery state), a low battery signal is output to charge mode switching portion 51 to indicate that the remaining level of secondary battery 41 is low. It is noted that since the remaining level of secondary battery 41 has a prescribed relation to the output voltage, charge level detection portion 55 does not actually calculate the remaining level but compares the output voltage of secondary battery 41 with a predetermined threshold value and, if the output voltage is equal to or lower than the threshold value, outputs the low battery signal to charge mode switching portion 51.

Charge mode switching portion 51 determines a charge mode for charging secondary battery 41 based on the transmission power level input form transmission power detection portion 53 and the output voltage of secondary battery 41 input from charge level detection portion 55 and controls charging circuit 42 with the determined charge mode. The charge mode includes a continuous charge mode of continuously applying voltage to the secondary battery, an intermittent charge mode of discontinuously applying voltage to the secondary battery, and a charge-off mode of not applying voltage to the secondary battery.

Figure 4:
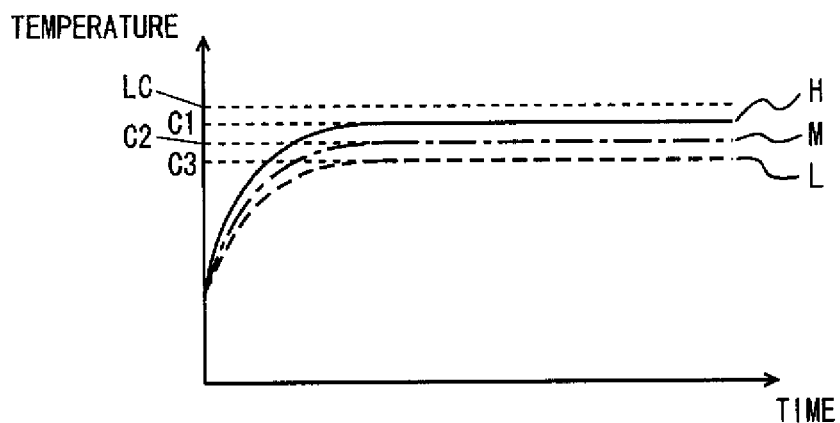
FIG. 4 is an illustration showing examples of temperature variations for various transmission power levels of a radio circuit.

Here, heat generation for various transmission power levels of radio circuit 22 will be described. FIG. 4 illustrates examples of temperature variations for various transmission power levels of radio circuit 22. The temperature variation in the case of the transmission power level "strong" is represented by a solid line H. The temperature of radio circuit 22 rises up to a temperature C1 over time. The temperature variation in the case of the transmission power level "medium" is represented by alternate long and short dashed lines M. The temperature of radio circuit 22 rises up to a temperature C2 over time. Temperature C2 is lower than temperature C1. The temperature variation in the case of the transmission power level "weak" is represented by a dotted line L. The temperature of radio circuit 22 rises up to a temperature C3 over time. Temperature C3 is lower than temperature C2. Here, assuming that a temperature at which people feel mobile phone 1 is hot and experience discomfort during use of mobile phone 1 is LC, temperature C1 is close to temperature LC. Therefore, when secondary battery 41 is charged and generates heat, the temperature of mobile phone 1 rises as high as to temperature LC.

Returning to FIG. 3, charge mode switching portion 51 detects whether or not external power supply 45 is connected to external power supply terminal 43 by detecting a voltage across opposite ends of external power supply terminal 43. In the case where external power supply 45 is connected to external power supply terminal 43, charge mode switching portion 51 switches to the charge-off mode when the transmission power level "strong" is input from radio circuit 22. In the charge-off mode, charge mode switching portion 51 switches charging circuit 42 to an off state. Since radio circuit 22 wirelessly communicates in the transmission level "strong," the temperature of the radio circuit rises up to C1. If secondary battery 41 is continuously charged in this state, the temperature of mobile phone 1 exceeds temperature LC. Therefore, charging of secondary battery 41 is avoided in order to prevent the user from feeling hot and discomfort.

Figure 5:
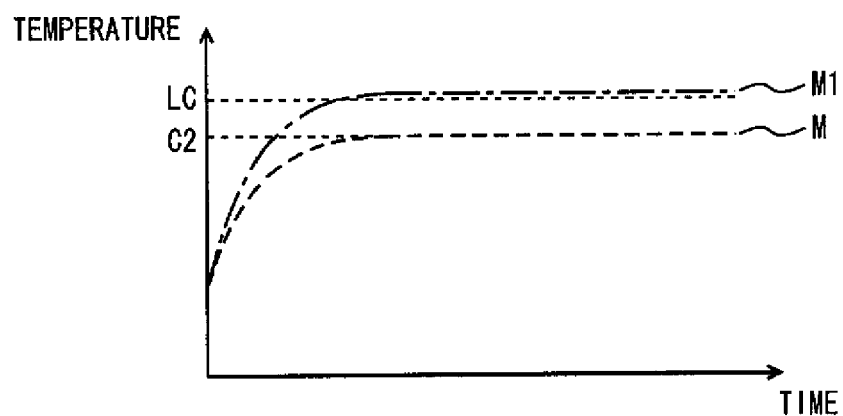
FIG. 5 is a first illustration showing an example of temperature variation of the mobile phone.

FIG. 5 is a first illustration showing an example of temperature variation of mobile phone 1. FIG. 5 shows a temperature variation of mobile phone 1 in a case where the secondary battery is charged in the continuous charge mode and the radio circuit is driven in the transmission power level "medium." Referring to FIG. 5, the temperature variation of mobile phone 1 is represented by a line M1 and the temperature variation of radio circuit 22 is represented by a dotted line M. The temperature of mobile phone 1 is higher than the temperature of radio circuit 22 and becomes higher than temperature LC after a period of time. Therefore, while radio circuit 22 wirelessly communicates in the transmission power level "medium," charging of secondary battery 41 in the continuous charge mode causes mobile phone 1 to reach temperature LC, resulting in that the user feels mobile phone 1 is hot and experiences discomfort.

Then, in the case where external power supply 45 is connected to external power supply terminal 43, charge mode switching portion 51 switches to the intermittent charge mode when the transmission power level "medium" is input from radio circuit 22. In the intermittent charge mode, charge mode switching portion 51 repeats the cycle of switching charging circuit 42 to an on state during a first period TC1 and to an off state in the following second period TC2. In the intermittent charge mode, secondary battery 41 repeats charging and discharging, so that the call-enabled duration can be extended, as compared with the charge-off mode.

Figure 6:
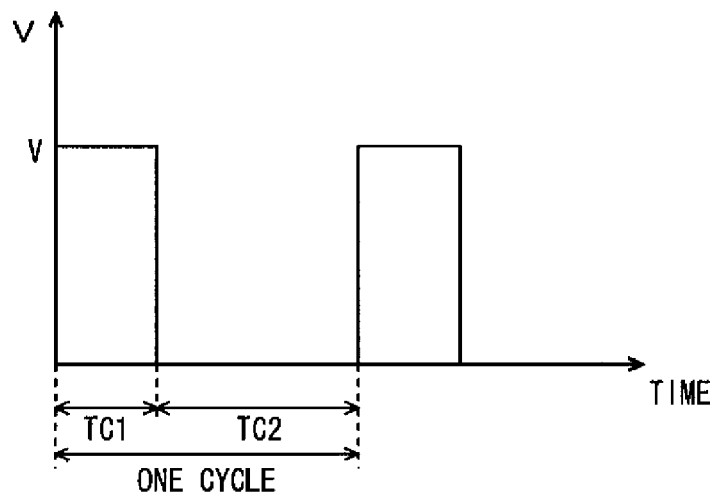
FIG. 6 is an illustration showing an example of an output voltage of a charging circuit.

FIG. 6 illustrates an example of output voltage of charging circuit 42. Referring to FIG. 6, in one cycle of the intermittent charge mode, voltage V is applied to secondary battery 41 in the initial first period TC1 and voltage is not applied to secondary battery 41 in the following second period TC2. Therefore, secondary battery 41 receives power from external power supply 45 during the first period TC1 to be charged, resulting in a temperature increase. However, power is not supplied during the following second period TC2, so that the temperature of secondary battery 41 drops. Therefore, in the intermittent charge mode, the temperature of secondary battery 41 is not increased to the temperature attained in the continuous charge. Charge mode switching portion 51 executes at least one cycle in the intermittent charge mode. Therefore, in the intermittent charge mode, the charge mode is not switched to another mode during one cycle.

Figure 7:
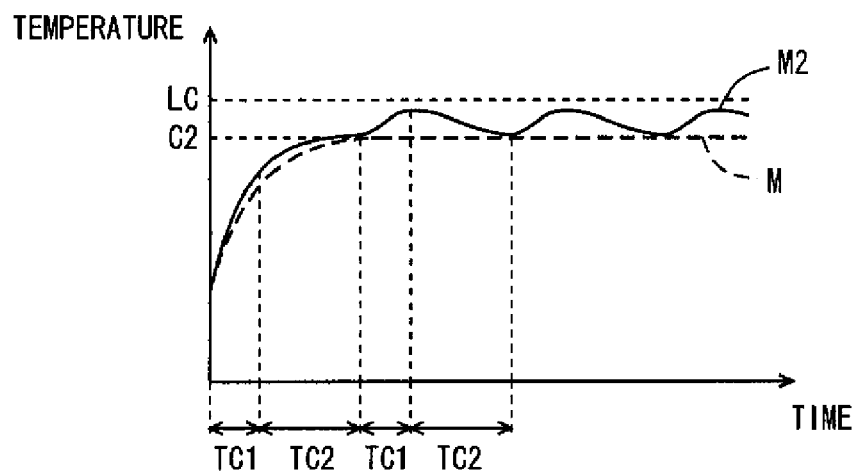
FIG. 7 is a second illustration showing an example of temperature variation of the mobile phone.

FIG. 7 is a second illustration showing an example of temperature variation of mobile phone 1. FIG. 7 shows a temperature variation of mobile phone 1 in a case where secondary battery 41 is charged in the intermittent charge mode and radio circuit 22 is driven in the transmission power level "medium." Referring to FIG. 7, the temperature variation of mobile phone 1 is represented by a line M2 and the temperature variation of radio circuit 22 is represented by a dotted line M. The temperature of mobile phone 1 is higher than the temperature of radio circuit 22 but lower than temperature LC. Therefore, while radio circuit 22 wirelessly communicates in the transmission power level "medium," the temperature LC is not reached even when secondary battery 41 is charged in the intermittent charge mode. Therefore, people do not feel mobile phone 1 is hot and do not experience discomfort during use of mobile phone 1.

In the case where external power supply 45 is connected to external power supply terminal 43, charge mode switching portion 51 switches to the continuous charge mode when the transmission power level "weak" is input from radio circuit 22. When radio circuit 22 wirelessly communicates in the transmission power level "weak," the amount of heat generation of radio circuit 22 is small as compared with when the transmission power level is "medium" or stronger. Therefore, although secondary battery 41 generates heat during charging, the temperature rise in mobile phone 1 as a whole is relatively small, so that the user does not feel mobile phone 1 is hot and does not experience discomfort. In addition, in the continuous charge mode, the call-enabled state is maintained since the secondary battery is charged.

Figure 8:
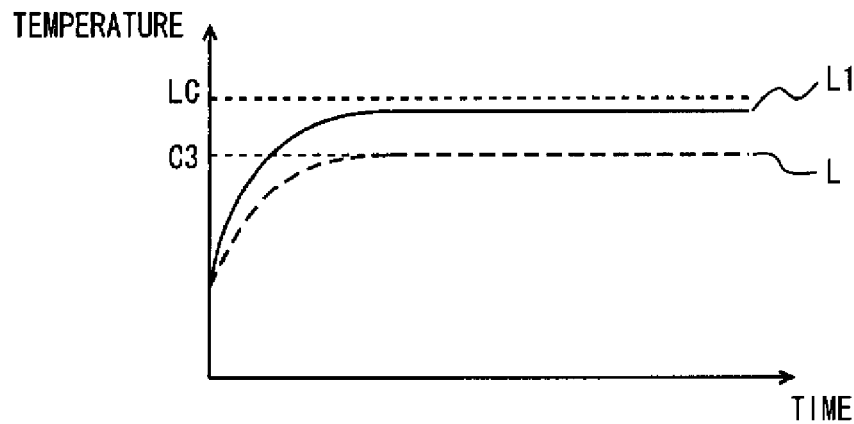
FIG. 8 is a third illustration showing an example of temperature variation of the mobile phone.

FIG. 8 is a third illustration showing an example of temperature variation of mobile phone 1. FIG. 8 shows a temperature variation of mobile phone 1 in a case where secondary battery 41 is charged in the continuous charge mode and the radio circuit is driven in the transmission power level "weak." Referring to FIG. 8, the temperature variation of mobile phone 1 is represented by a line L1 and the temperature variation of radio circuit 22 is represented by a dotted line L. The temperature of mobile phone 1 is higher than the temperature of radio circuit 22 but does not exceed the temperature LC. Therefore, while radio circuit 22 wirelessly communicates in the transmission power level "weak," the temperature LC is not reached even when secondary battery 41 is charged in the continuous charge mode. Therefore, people do not feel mobile phone 1 is hot and do not experience discomfort during use of mobile phone 1.

In the case where external power supply 45 is connected to external power supply terminal 43, charge mode switching portion 51 determines that radio circuit 22 is not enabled, unless a transmission power level is input from radio circuit 22, and switches to the continuous charge mode. The reason is as follows. Since radio circuit 22 is not enabled, it is likely that the user does not carry mobile phone 1, so that the user does not feel hot even when secondary battery 41 generates heat.

In addition, charge mode switching portion 51 counts an elapsed time since the time at which radio circuit 22 started transmission, in other words, the time at which a call was started, and forcedly switches from the charge-off mode or the intermittent charge mode to the continuous charge mode before a lapse of a prescribed time after the start of the call, when the low battery signal is input from charge level detection portion 55. In the charge-off mode, secondary battery 41 is not charged but discharged, so that the power storage level of secondary battery 41 is reduced. In the intermittent charge mode, if power to be discharged is greater than power to be charged, the power storage level of the secondary battery is reduced. If the power storage level of secondary battery 41 becomes lower than the low battery state, radio circuit 22 cannot be driven. However, switching to the continuous charge mode allows radio circuit 22 to be continuously driven.

In addition, in an emergency mode, charge mode switching portion 51 forcedly switches to the continuous charge mode when the low battery signal is input from charge level detection portion 55. The emergency mode takes place when radio circuit 22 establishes a connection with a telephone having a telephone number assigned as an emergency contact and stored beforehand in EEPROM 33. If the power storage level of secondary battery 41 becomes lower than the low battery state, radio circuit 22 cannot be driven. However, switching to the continuous charge mode allows radio circuit 22 to be continuously driven, thereby preventing the established connection with the emergency contact from being terminated. The emergency contact referred to herein may be a predetermined contact, such as the police (110) or fire or medical assistance service (119) in Japan, or Emergency Number 911 in the United States, or may be a contact set by the user as an emergency contact (for example, a contact with whom the user wishes to surely communicate, such as a telephone number of a family doctor or an important client).

Figure 9:
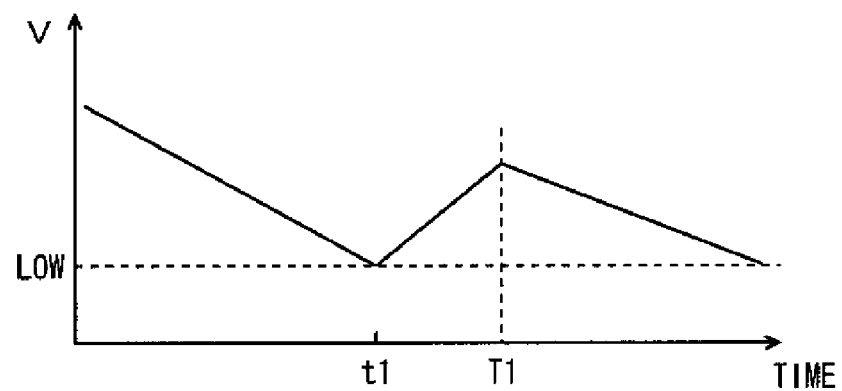
FIG. 9 is a first illustration showing an example of a changing output voltage of a secondary battery.

FIG. 9 is a first illustration showing an example of a changing output voltage of the secondary battery. FIG. 9 shows an output voltage of secondary battery 41 in a case where secondary battery 41 enters the low battery state at a time t1 before a prescribed time T1 elapses after radio circuit 22 starts being driven in the transmission power level "strong," without charging secondary battery 41 in the charge-off mode. The output voltage of secondary battery 41 is reduced until time t1 as the power storage level for power supply to radio circuit 22 becomes lower, and secondary battery 41 enters the low battery state at time t1. Thereafter, secondary battery 41 is charged in the continuous charge mode until a prescribed period T1 has elapsed since the start of the call, and the output voltage thus rises with increasing power storage level. After a lapse of a prescribe period T1, the charge-off mode is set. Thus, the output voltage of secondary battery 41 is reduced with decreasing power storage level as secondary battery 41 supplies power to radio circuit 22. Therefore, secondary battery 41 can supply power to radio circuit 22 at least during a prescribed period T1 after the start of the call, so that radio circuit 22 can be driven at least during a prescribed period.

Figure 10:
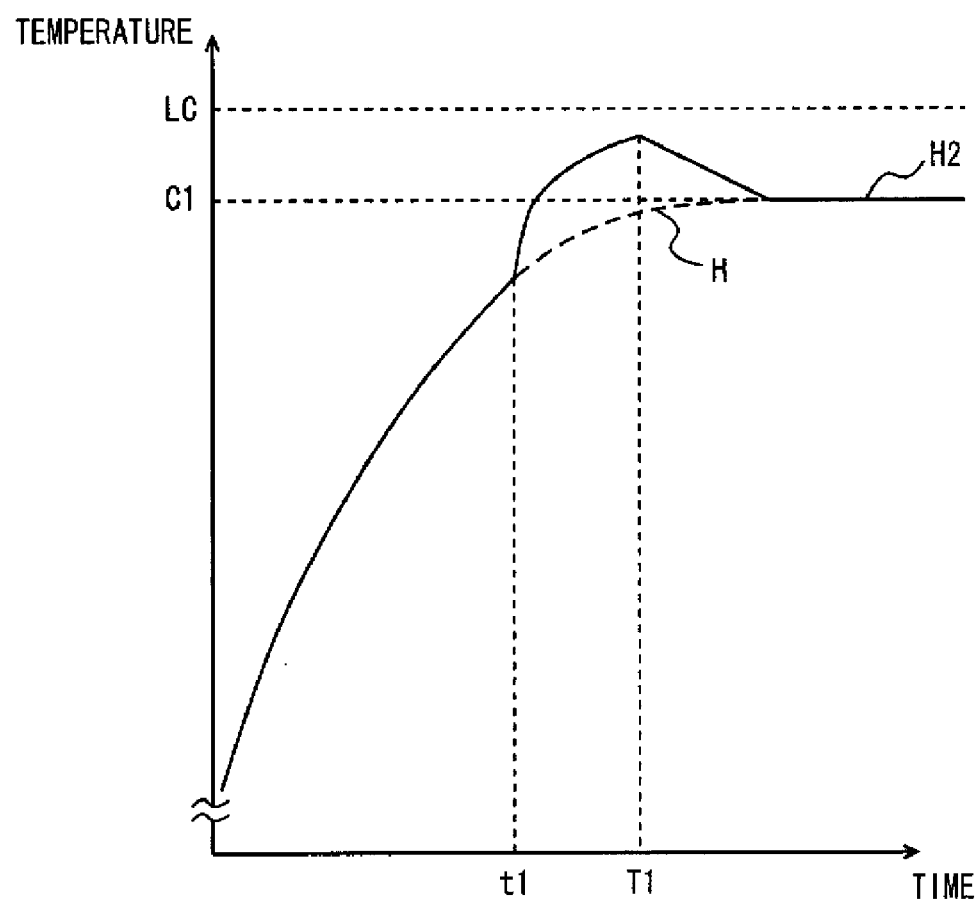
FIG. 10 is a fourth illustration showing an example of temperature variation of the mobile phone.

FIG. 10 is a fourth illustration showing a temperature variation of the mobile phone. In FIG. 10, a solid line H2 represents a temperature variation of mobile phone 1 in a case where a secondary battery 41 enters the low battery state at time t1 before a prescribed time T1 elapses after radio circuit 22 starts being driven in the transmission power level "strong," without charging secondary battery 41 in the charge-off mode. Until time t1 after the call was started and radio circuit 22 started being driven, the temperature variation is similar to that of mobile phone 1 shown by solid line H in FIG. 4. After time t1, secondary battery 41 is charged in the continuous charge mode and thus the temperature of mobile phone 1 is increased by the heat generated by secondary battery 41. Although FIG. 10 illustrates an example in which a prescribed time T1 is set such that the temperature of mobile phone 1 does not exceed the temperature LC, the temperature of mobile phone 1 may exceed the temperature LC. A prescribed period T1 is preferably defined such that the temperature of mobile phone 1 does not exceed the temperature LC.

Figure 11:
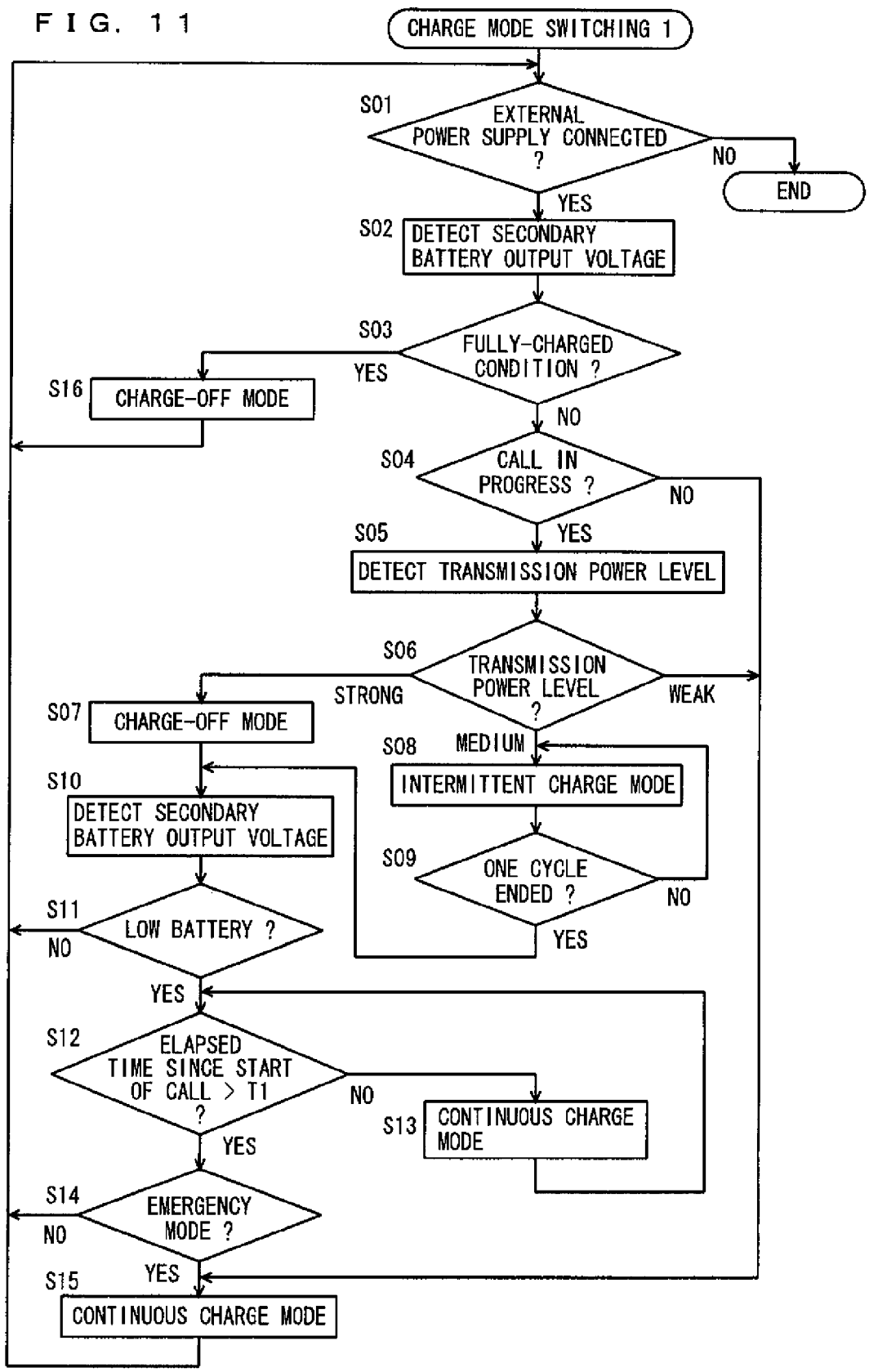
FIG. 11 is a flowchart illustrating an exemplary flow of a charge mode switching process.

FIG. 11 is a flowchart illustrating an exemplary flow of a charge mode switching process. The charge mode switching process is a process performed by control portion 21 by control portion 21 executing a charge mode switching program stored in ROM 31. Referring to FIG. 11, control portion 21 determines whether or not external power supply 45 is connected (step S01). If a prescribed voltage is detected across opposite ends of external power supply terminal 43, it is determined that external power supply 45 is connected to external power supply terminal 43, and the process then proceeds to step S02. If not, the process ends. In other words, the charge mode switching process during call is a process performed in the state where mobile phone 1 receives power supply from external power supply 45.

In step S02, the output voltage of secondary battery 41 is detected. Then, it is determined whether secondary battery 41 is fully charged, based on the output voltage (step S03). The output voltage in the fully-charged condition of secondary battery 41 is stored beforehand as a threshold value so that the output voltage detected in step S02 is compared with the threshold value. If the output voltage detected in step S02 is higher than the threshold voltage, it is determined that secondary battery 41 is fully charged, and the process then proceeds to step S16. If not, the process proceeds to step S04. In step S116, the mode is switched to the charge-off mode, and the process returns to step S01. This is because charging is not necessary if secondary battery 41 is fully charged.

In step S04, it is determined whether or not a telephone call is in progress. If radio circuit 22 establishes a connection with a radio base station, it is determined that a telephone call is in progress, and if not, it is determined that a telephone call is not in progress. If a telephone call is in progress, the process proceeds to step S05, and if not in progress, the process proceeds to step S15. In step S15, the mode is switched to the continuous charge mode, and the process returns to step S01. The reason is as follows. If a telephone call is not in progress, radio circuit 22 does not generate heat, and therefore, charging secondary battery 41 does not cause the temperature of mobile phone 1 to rise to the temperature LC.

In step S05, the transmission power level of radio circuit 22 is detected. In the process of detecting the transmission power level as described later, the transmission power level included in a control signal received from a base station is detected. Then, in step S06, the process branches depending on the transmission power level of radio circuit 22. If the transmission power level is strong, the process proceeds to step S07, if medium, the process proceeds to step S08, and if weak, the process proceeds to step S15. In other words, the charge mode for charging secondary battery 41 is switched based on the transmission power level included in a control signal received from a base station. Here, the transmission power level may be determined based on the electric field intensity of radio waves transmitted by a base station, and the charge mode for charging secondary battery 41 may be switched based on that transmission power level. In the case where the process proceeds from step S06 to step S15, the transmission power level is weak. In this case, although radio circuit 22 generates heat to cause the temperature to rise up to the temperature C3, the temperature of mobile phone 1 does not rise to the temperature LC even when secondary battery 41 is charged in the continuous charge mode and generates heat.

In step S07, the mode is switched to the charge-off mode, and the process proceeds to step S10. If the transmission power level is strong, radio circuit 22 generates heat to cause the temperature to rise up to the temperature C1, and therefore, charging of secondary battery 41 is avoided in order to prevent the temperature of mobile phone 1 from rising to the temperature LC.

In step S08, the mode is switched to the intermittent charge mode, and the process then proceeds to step S09. If the transmission power level is medium, radio circuit 22 generates heat to cause the temperature to rise up to the temperature C2. However, the difference from the temperature LC is relatively big. On the other hand, in the intermittent charge mode, the temperature of secondary battery 41 does not rise to the temperature reached in the continuous charge mode. Therefore, even when secondary battery 41 is charged in the intermittent charge mode and generates heat, the temperature of mobile phone 1 does not rise to the temperature LC. Furthermore, in the intermittent charge mode, secondary battery 41 repeats charging and discharging, so that the call-enabled duration can be extended as compared with the charge-off mode. Here, if the ratio between the first period TC1 and the second period TC2 in the intermittent charge mode is adjusted such that power to be charged is greater than power to be discharged, the low battery state of secondary battery 41 is avoided and thus a call is not terminated.

In step S09, it is determined whether or not one cycle of the intermittent charge mode is ended. If one cycle is ended, the process proceeds to step S10, and if not ended, the process returns to step S08. The intermittent charge mode is kept at least in one cycle in order to prevent a change of the charge mode according to frequently changing transmission power levels between strong and medium or between medium and weak. Thus, the frequency of switching between the on state and the off state by charging circuit 42 can be reduced.

In step S110, an output voltage of secondary battery 41 is detected, similarly to step S02. Then, it is determined whether or not secondary battery 41 is in the low battery state based on the detected output voltage (step S11). If a low battery signal is received from voltage detection portion 44, it is determined that secondary battery 41 is in the low battery state. If in the low battery state, the process proceeds to step S12, and if not, the process returns to step S01. In step S12, it is determined whether or not the time elapsed since the start of a call exceeds a prescribed time T1. If a prescribed time T1 has not elapsed since the call was started, the process proceeds to step S13, and if a prescribed time has elapsed, the process proceeds to step S14. In step S13, the mode is switched to the continuous charge mode, and the process returns to step S12. If a prescribed time T1 has not elapsed since a call was started, secondary battery 41 is charged in the normal charge mode until a prescribed time T1 after secondary battery 41 enters the low battery state. Therefore, until at least a prescribed time T1 has elapsed since the start of a call, the call can be maintained without being terminated.

In step S14, whether the emergency mode or not is determined. In the emergency mode, for example, a line is connected with a telephone having a telephone number assigned as an emergency contact and stored in EEPROM 33 beforehand. If the emergency mode, the process proceeds to step S15, and if not the emergency mode, the process returns to step S01. In the emergency mode, the mode is switched to the continuous charge mode, so that the low battery state of secondary battery 41 and thus disconnection of the line and termination of a call can be prevented.

Here, either in the continuous charge mode or in the intermittent charge mode, if the fully-charged condition is achieved (YES in step S03), the mode is switched to the charge-off mode, so that secondary battery 41 is not charged.

Figure 12:
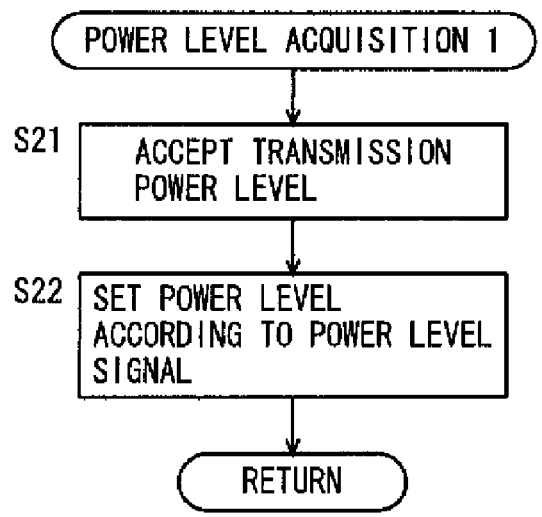
FIG. 12 is a flowchart illustrating an exemplary flow of a power level detection process.

FIG. 12 is another flowchart illustrating an exemplary flow of a power level detection process. The power level detection is a process performed in step S05 in FIG. 11. Referring to FIG. 12, control portion 21 accepts the transmission power level received by radio circuit 22 from a radio base station (step S21). Then, radio circuit 22 is driven with the accepted transmission power level (step S22).

Figure 13:
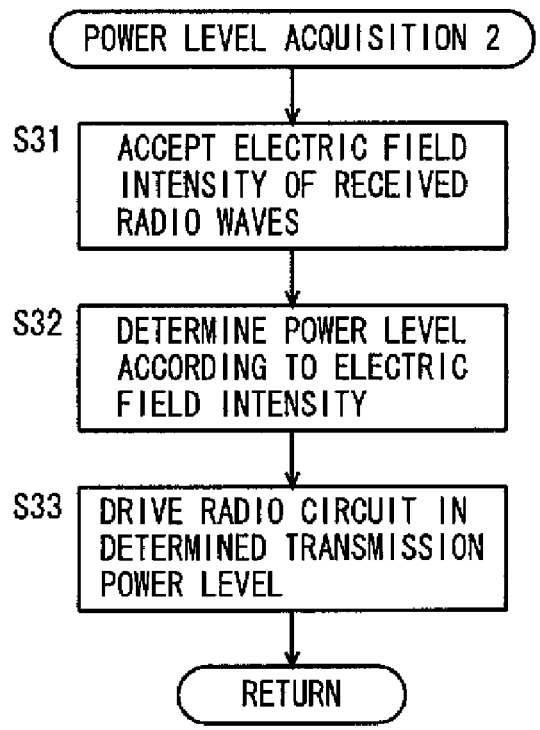
FIG. 13 is another flowchart illustrating an exemplary flow of a power level detection process.

FIG. 13 is a flowchart illustrating an exemplary flow of a power level detection process. The power level detection process is a process performed in step S05 in FIG. 11. Referring to FIG. 13, control portion 21 accepts an electric field intensity of radio waves received by radio circuit 22 from a radio base station (step S31). Then, a transmission power level corresponding to the accepted electric field intensity is determined (step S32), and radio circuit 22 is driven with the determined transmission power level (step S33).

Here, in step S14, an elapsed time since detection of the low battery state may be counted, so that the mode is switched to the continuous charge mode for a prescribed time after detection of the low battery state.

<Modification>

In the foregoing embodiment, a call is maintained for at least a prescribed time T1 after the start of a call, by forcedly switching to the continuous charge mode after the low battery state of secondary battery 41 is detected in the charge-off mode or in the intermittent charge mode. In a modified embodiment, the mode is forcedly switched to the continuous charge mode for a prescribed time T2 before switching to the charge-off mode or the intermittent charge mode.

Figure 14:
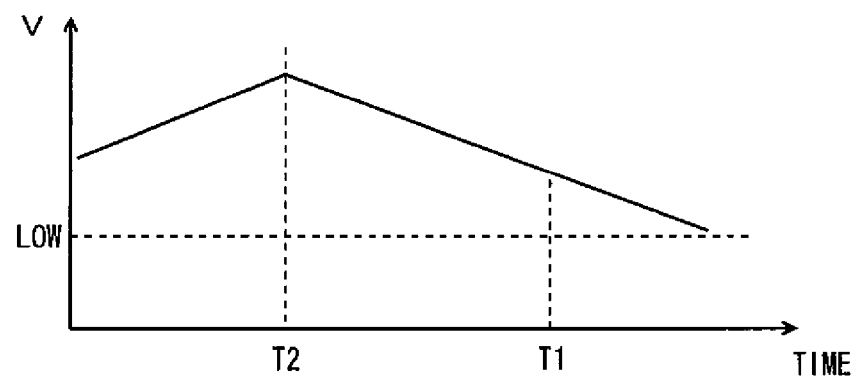
FIG. 14 is a second illustration showing an example of a changing output voltage of a secondary battery.

FIG. 14 is a second illustration showing an example of a changing output voltage of the secondary battery. FIG. 14 illustrates an output voltage of secondary battery 41 in a case where secondary battery 41 is charged by forcedly switching to the continuous charge mode for a prescribed period T2 before switching to the charge-off mode, and thereafter the mode is switched to the charge-off mode. Secondary battery 41 is charged in the normal charge mode until a prescribed time T2 has elapsed since the start of a call, so that the power storage level is gradually increased, and the output voltage rises. Then, the charge-off mode follows, and the power storage level is gradually decreased because of discharging, and the output voltage drops. However, power stored until a prescribed time T2 has elapsed since the start of the call can be supplied to radio circuit 22. If a prescribed time T2 is a time period required to store in secondary battery 41 power necessary to drive radio circuit 22 for a prescribed period (T1-T2) after a call is started, radio circuit 22 can be driven for at least a prescribed period T1 after the start of the call.

Figure 15:
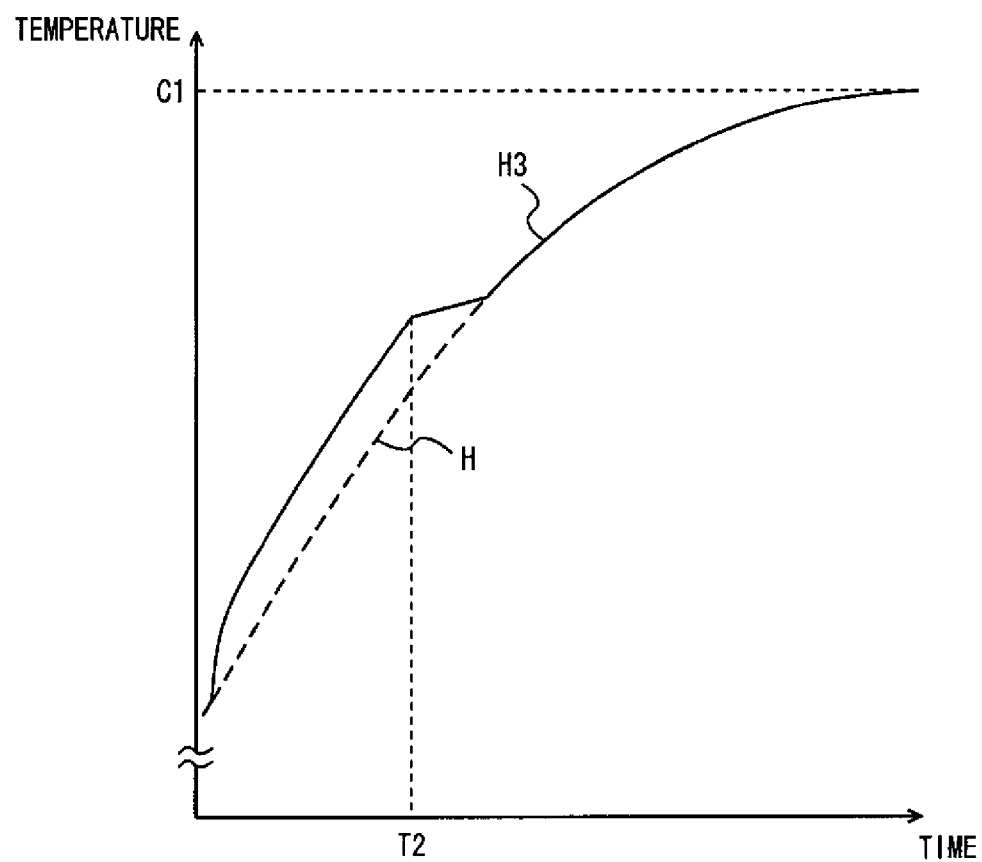
FIG. 15 is a fifth illustration showing an example of temperature variation of the mobile phone.

FIG. 15 is a fifth illustration showing a temperature variation of the mobile phone. In FIG. 15, a solid line H3 represents a temperature variation of mobile phone 1 in a case where secondary battery 41 is charged by forcedly switching to the continuous charge mode for a prescribed period T2 before switching to the charge-off mode, and thereafter the mode is switched to the charge-off mode. In addition, a dotted line H represents a temperature variation of mobile phone 1 in a case where radio circuit 22 is driven in the transmission power level "strong" without charging secondary battery 41. Secondary battery 41 is charged in the normal charge mode until a prescribed time T2 has elapsed since the start of a call by radio circuit 22 driving, and secondary battery 41 generates heat, so that the temperature becomes higher than the temperature of mobile phone 1 as represented by dotted line H but is lower than the temperature LC. After a lapse of prescribed time T2, secondary battery 41 is not charged and therefore the temperature of secondary battery 41 gradually falls. Therefore, the temperature variation of mobile phone 1 gradually approaches the temperature of mobile phone 1 in the case where radio circuit 22 is driven in the transmission power level "strong" without charging secondary battery 41. In this manner, secondary battery 41 is charged in a stage before radio circuit 22 reaches temperature C1, thereby avoiding the temperature of mobile phone 1 exceeding the temperature LC. In addition, power for driving radio circuit 22 for at least a prescribed period after the start of a call can be stored in secondary battery 41.

Figure 16:
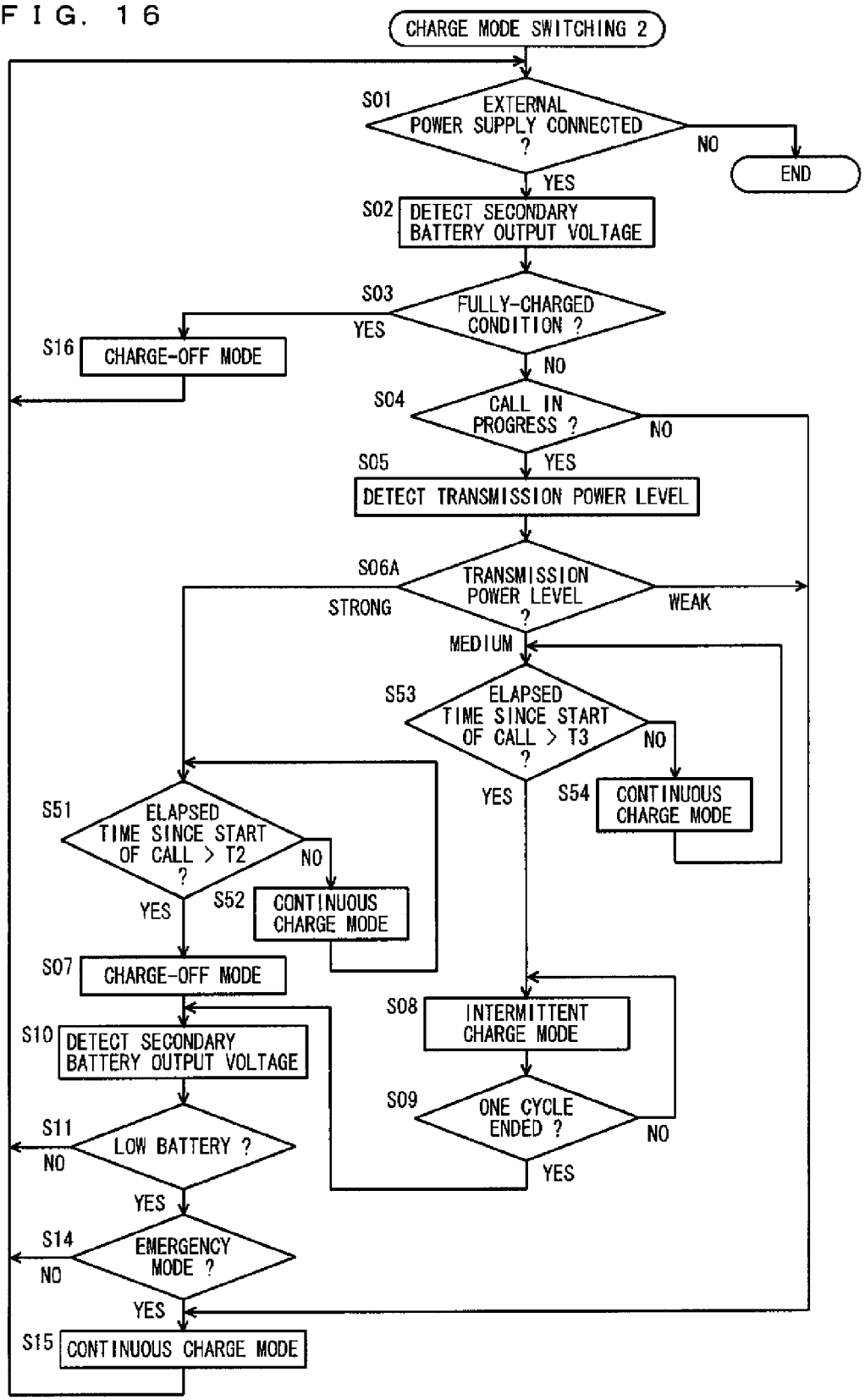
FIG. 16 is a flowchart illustrating an exemplary flow of a charge mode switching process in a modification.

FIG. 16 is a flowchart illustrating an exemplary flow of a charge mode switching process in the modified embodiment. The process identical to the process shown in FIG. 11 is denoted by the same reference character. In the following, differences from the charge mode switching process shown in FIG. 11 will mainly be described. Referring to FIG. 16, after detection of a transmission power level in step S05, in step S06A, the process branches depending on the transmission power level of radio circuit 22. If the transmission power level is strong, the process proceeds to step S51, if medium, the process proceeds to step S53, and if weak, the process proceeds to step S15. In step S51, it is determined whether or not an elapsed time since the start of a call exceeds a predetermined prescribed time T2. If exceeding a prescribed time T2, the process proceeds to step S07, and if not, the process proceeds to step S52. In step S52, the mode is switched to the continuous charge mode, and the process then returns to step S51. In step S07, the mode is switched to the charge-off mode, and the process then proceeds to step S11. In short, the mode is switched to the continuous charge mode from the start of the call to a prescribed time T2 and is then switched to the charge-off mode after a lapse of prescribed time T2.

In step S53, it is determined whether or not the elapsed time since the start of the call exceeds a predetermined time T3. A prescribed time T2 in step S51 is longer than a prescribed time T3 in step S53. This is because while secondary battery 41 is not charged in the charge-off mode, secondary battery 41 is charged in the intermittent charge mode. Here, a prescribed time T2 in step S51 and a prescribed time T3 in step S53 may be the same period. If exceeding a prescribed time T3, the process proceeds to step S08, and if not, the process proceeds to step S54. In step S54, the mode is switched to the continuous charge mode, and the process then returns to step S53. In step S08, the mode is switched to the intermittent charge mode, and the process then proceeds to step S09. In short, the mode is switched to the continuous charge mode from the start of the call to a prescribed time T3 and is then switched to the intermittent charge mode after a lapse of a prescribed time T3.

In step S11, whether the low battery state or not is determined based on the output voltage of secondary battery 41 detected in step S10 (step S11). If the low battery state, the process proceeds to step S14, and if not, the process returns to step S01. In step S14, whether the emergency mode or not is determined. If the emergency mode, the process proceeds to step S15, and if not emergency mode, the process returns to step S01. In the emergency mode, the mode is switched to the continuous charge mode, thereby preventing the low battery state of secondary battery 41 and therefore disconnection of the line and termination of a call.

As described above, mobile phone 1 in the present embodiment detects a transmission power level of radio circuit 22 (S05) and switches to any one of a plurality of charge modes having different time periods for charging the secondary battery, based on the detected transmission power level (S06, S07, S08, S15). Radio circuit 22 allowing transmission power to be varied generates a larger amount of heat with increasing transmission power. Here, the charge mode for charging secondary battery 41 is switched based on the transmission power level and the charge period is varied, so that the amount of heat generation from secondary battery 41 can be limited and a temperature rise of mobile phone 1 to the temperature LC can be prevented. In addition, the power storage level of secondary battery 41 is increased as much as possible so that the call duration can be extended.

Moreover, in the charge-off mode or the intermittent charge mode, if secondary battery 41 enters the low battery state before a prescribed time T1 elapses after the start of a call, the mode is switched to the continuous charge mode until a prescribed time T has elapsed. Therefore, the call can be maintained for at least a prescribed time T after the start of the call. Furthermore, if prescribed time T1 is set as a time before radio circuit 22 reaches the temperature C1 or C2, a temperature rise of mobile phone 1 to the temperature LC can be prevented.

In addition, if the transmission power of radio circuit 22 is not the transmission power level "weak," the mode is switched to the continuous charge mode until a prescribed period T2 (T3) has elapsed since the start of a call. Therefore, secondary battery 41 is charged in the continuous charge mode in a stage before the amount of heat generation from radio circuit 22 becomes maximum, thereby avoiding mobile phone 1 reaching the temperature LC which is the upper limit value. Furthermore, if a prescribed period T2 (T3) is set as a time before radio circuit 22 reaches temperature C1 (C2) for a prescribed period after the start of a call, a temperature rise of mobile phone 1 to the temperature LC can be prevented. If a prescribed period T2 (T3) is set as a time required to store in secondary battery 41 power necessary to drive radio circuit 22 for a prescribed period (T1-T2) ((T1-T3)) after the start of a call, radio circuit 22 can be driven for at least a prescribed period T1 after the start of a call.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile communication terminal comprising:
a power reception portion to externally receive power;
a charge portion to charge at least part of said received power and supply the charged power to a load;
a radio communication portion to receive power from said charge portion and allow transmission power to be varied;
a transmission power detection portion to detect transmission power of said radio communication portion; and
a control portion to switch to any one of a plurality of charge modes having different time periods to charge said charge portion, based on said detected transmission power, wherein
said plurality of charge modes include a charge-off mode in which charging is not performed, an intermittent charge mode in which a charge period and a non-charge period are repeated, and a continuous charge mode in which charging is continuously performed, and
said control portion includes a charge mode switching portion to switch to the charge-off mode, if said detected transmission power is at a first level, to switch to the intermittent charge mode, if said detected transmission power is at a second level at which transmission power is smaller than the first level, and to switch to the continuous charge mode, if said detected transmission power is at a third level at which transmission power is smaller than said second level.

2. The mobile communication terminal according to claim 1, wherein said charge mode switching portion includes a forcedly switching portion to switch to said continuous charge mode until a prescribed period has elapsed, when an output voltage of said charge portion becomes equal to or lower than a prescribed value before said prescribed period elapses after said radio communication portion is enabled, in said charge-off mode or in said intermittent charge mode.

3. The mobile communication terminal according to claim 1, wherein said charge mode switching portion includes a forcedly switching portion to switch to said continuous charge mode when an output voltage of said charge portion becomes equal to or lower than a prescribed value, in said charge-off mode or in said intermittent charge mode, while said radio communication portion communicates with a predetermined contact.

4. The mobile communication terminal according to claim 1, further comprising a switching portion provided between said power reception portion and said charge portion to switch to one of an on state in which power is supplied from said power reception portion to said charge portion and an off state in which power is not supplied, wherein
said control portion further includes a switching control portion to switch said switching portion to the off state in said charge-off mode, to repeat a cycle including a first period in which said switching portion is switched to the on state and a second period in which said switching portion is switched to the off state in said intermittent charge mode, and to switch said switching portion to the on state in said continuous charge mode.

5. The mobile communication terminal according to claim 1, wherein said charge mode switching portion includes a forcedly switching portion to switch to said continuous charge mode until a prescribed time has elapsed since said radio communication portion was enabled, if said detected transmission power is not said third level.

6. A charge mode switching method performed in a mobile communication terminal, said mobile communication terminal including
a power reception portion to externally receive power,
a charge portion to charge at least part of said received power and supply the charged power to a load, and
a radio communication portion to receive power from said charge portion and allow transmission power to be varied,
said charge mode switching method comprising the steps of:
detecting transmission power of said radio communication portion; and
switching to any one of a plurality of charge modes having different time periods for charging said charge portion, based on said detected transmission power, wherein
said plurality of charge modes include a charge-off mode in which charging is not performed, an intermittent charge mode in which a charge period and a non-charge period are repeated, and a continuous charge mode in which charging is continuously performed, and
said charge mode switching method further comprising the steps of:
switching to the charge-off mode, if said detected transmission power is at a first level:
switching to the intermittent charge mode, if said detected transmission power is at a second level at which transmission power is smaller than the first level; and
switching to the continuous charge mode, if said detected transmission power is at a third level at which transmission power is smaller than said second level.

7. The charge mode switching method according to claim 6, further comprising the step of switching to said continuous charge mode until a prescribed period has elapsed, when an output voltage of said charge portion becomes equal to or lower than a prescribed value before said prescribed period elapses after said radio communication portion is enabled, in said charge-off mode or in said intermittent charge mode.

8. The charge mode switching method according to claim 6, further comprising the step of switching to said continuous charge mode when an output voltage of said charge portion becomes equal to or lower than a prescribed value, in said charge-off mode or in said intermittent charge mode, while said radio communication portion communicates with a predetermined contact.

9. The charge mode switching method according to claim 6, wherein said mobile communication terminal further includes a switching portion provided between said power reception portion and said charge portion to switch to one of an on state in which power is supplied from said power reception portion to said charge portion and an off state in which power is not supplied,
said charge mode switching method further comprising the steps of:
switching said switching portion to the off state in said charge-off mode;
repeating a cycle including a first period in which said switching portion is switched to the on state and a second period in which said switching portion is switched to the off state in said intermittent charge mode; and
switching said switching portion to the on state in said continuous charge mode.

10. The charge mode switching method according to claim 6, further comprising the step of switching to said continuous charge mode until a prescribed time has elapsed since said radio communication portion was enabled, if said detected transmission power is not said third level.

11. A charge mode switching program executed in a mobile communication terminal, said mobile communication terminal including
a power reception portion to externally receive power,
a charge portion to charge at least part of said received power and supply the charged power to a load,
a radio communication portion to receive power from said charge portion and allow transmission power to be varied, and
a control portion,
said charge mode switching program causing said control portion to perform the steps of:
detecting transmission power of said radio communication portion; and
switching to any of a plurality of charge modes having different time periods for charging said charge one portion, based on said detected transmission power, wherein
said plurality of charge modes include a charge-off mode in which charging is not performed, an intermittent charge mode in which a charge period and a non-charge period are repeated, and a continuous charge mode in which charging is continuously performed, and
said charge mode switching program further causing said control portion to perform the steps of:
switching to the charge-off mode, if said detected transmission power is at a first level:
switching to the intermittent charge mode, if said detected transmission power is at a second level at which transmission power is smaller than the first level; and
switching to the continuous charge mode, if said detected transmission power is at a third level at which transmission power is smaller than said second level.

12. The charge mode switching program according to claim 11, further causing said control portion to perform the step of switching to said continuous charge mode until a prescribed period has elapsed, when an output voltage of said charge portion becomes equal to or lower than a prescribed value before said prescribed period elapses after said radio communication portion is enabled, in said charge-off mode or in said intermittent charge mode.

13. The charge mode switching program according to claim 11, further causing said control portion to perform the step of switching to said continuous charge mode when an output voltage of said charge portion becomes equal to or lower than a prescribed value, in said charge-off mode or in said intermittent charge mode, while said radio communication portion communicates with a predetermined contact.

14. The charge mode switching program according to claim 11, wherein said mobile communication terminal further includes a switching portion provided between said power reception portion and said charge portion to switch to one of an on state in which power is supplied from said power reception portion to said charge portion and an off state in which power is not supplied,
said charge mode switching program further causing said control portion to perform the steps of:
switching said switching portion to the off state in said charge-off mode;
repeating a cycle including a first period in which said switching portion is switched to the on state and a second period in which said switching portion is switched to the off state in said intermittent charge mode; and switching said switching portion to the on state in said continuous charge mode.

15. The charge mode switching program according to claim 11, further causing said control portion to perform the step of switching to said continuous charge mode until a prescribed time has elapsed since said radio communication portion was enabled, if said detected transmission power is not said third level.

* * * * *